United States Patent [19]
Tesar

[11] Patent Number: 5,839,703
[45] Date of Patent: Nov. 24, 1998

[54] ANTI-ROTATION BRACKET

[75] Inventor: Robert D. Tesar, Independence, Ohio

[73] Assignee: Perfection Corporation, Madison, Ohio

[21] Appl. No.: 807,670

[22] Filed: Feb. 27, 1997

[51] Int. Cl.$^6$ ...................................................... F16L 3/08
[52] U.S. Cl. ........................... 248/65; 248/74.1; 285/61; 285/64; 403/13; 403/383
[58] Field of Search ..................... 248/74.1, 65, 309.1, 248/56; 403/383, 13; 284/61, 64; 52/220.8, 714

[56] References Cited

U.S. PATENT DOCUMENTS

| | | | |
|---|---|---|---|
| 662,935 | 12/1900 | Hibberd | 248/74.1 |
| 4,783,029 | 11/1988 | Geppert et al. | 248/65 X |
| 4,826,114 | 5/1989 | Umehara | 248/74.1 |
| 5,533,696 | 7/1996 | Laughlin et al. | 248/74.1 X |

FOREIGN PATENT DOCUMENTS 24861  9/1951  Finland .................................. 248/74.1

*Primary Examiner*—Ramon O. Ramirez
*Attorney, Agent, or Firm*—Fay, Sharpe, Beall, Fagan, Minnich & McKee

[57] ABSTRACT

The anti-rotation bracket according to the present invention prevents a pipe from rotating with respect to an appliance in which it is installed. The bracket includes a U-shaped member, an attachment mechanism for securing the U-shaped member to an appliance, and at least one clip extending from each of two legs of the U-shaped member for securing a rectangular crimped section of a pipe. The U-shaped member has a base and first and second legs which are spaced to receive the rectangular section of the pipe therebetween. The clips extend inward from each of the legs towards an opposite one of the legs and are configured to engage one of the flat surfaces of the rectangular section of the pipe to prevent rotation of the pipe with respect to the bracket when the bracket is attached to the appliance.

14 Claims, 3 Drawing Sheets

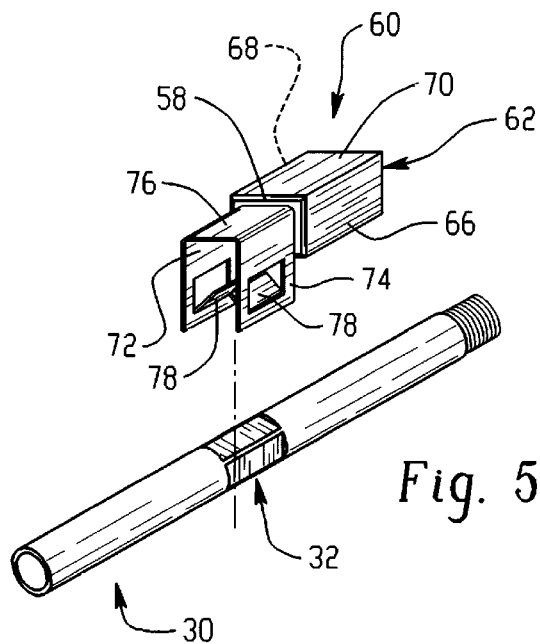
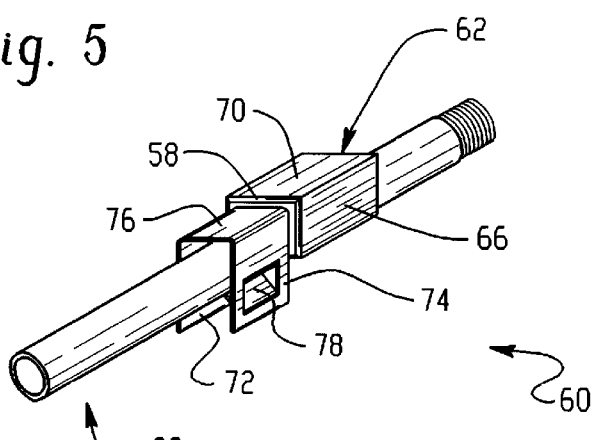
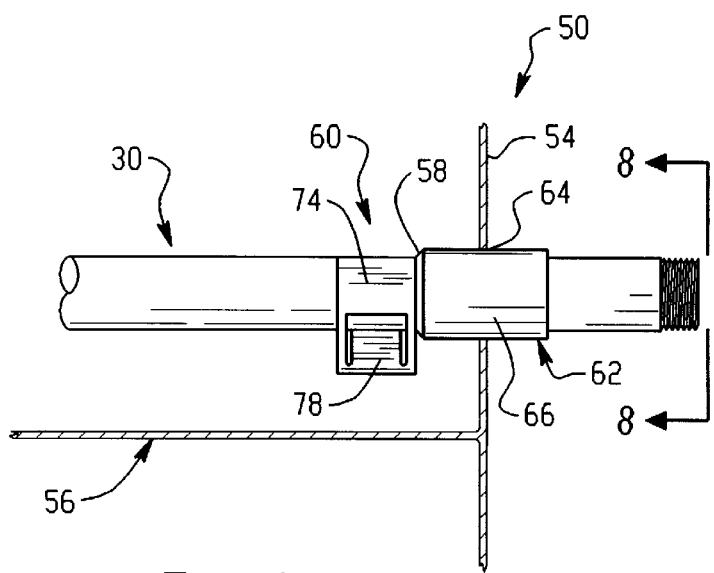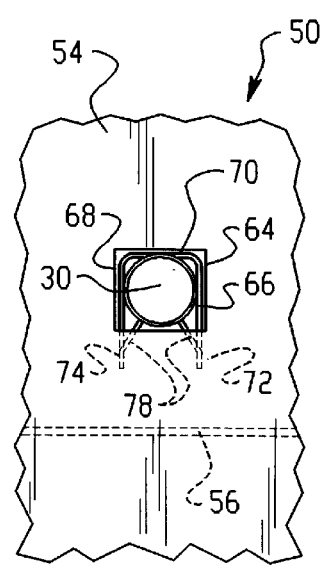

ANTI-ROTATION BRACKET

BACKGROUND OF THE INVENTION

The present invention relates to an anti-rotation bracket and more particularly to a bracket for attaching a fluid delivery pipe to a surface of an appliance to which the fluid is to be delivered.

Fluid delivery pipes, such as gas lines delivering gas to a gas appliance, enter the appliance through an exterior opening in the appliance shell generally in a rear panel of the shell. These lines are connected by various fittings on the interior of the appliance. The exterior openings in the appliances are larger in size than the pipe which is to be inserted into the opening and may be formed in different shapes such as square or circular. Once a fluid delivery pipe has been inserted through an appliance shell it is desirable that the pipe remain stationary while the installer connects the ends of the pipe by various couplings. However, due to the large size of the opening in the appliance the pipe will tend to move around and rotate during installation requiring the installer to use one hand to hold the pipe during installation while having only one hand free to install the rest of the fluid delivery system.

SUMMARY OF THE INVENTION

The device according to the present invention addresses the disadvantages of the prior art by providing an anti-rotation bracket which will prevent a pipe from rotating while the installer completes the installation of a fluid delivery pipe for delivery of a fluid to an appliance. This increases the ease and speed with which installation can be performed.

According to one aspect of the present invention, a bracket for preventing rotation of a pipe in an appliance includes a U-shaped member, an attachment mechanism for securing the U-shaped member to an appliance, and at least one clip extending from each of first and second legs of the U-shaped member. The U-shaped member has a base, a first leg and a second leg. The first and second legs have substantially equal lengths and are spaced to receive a rectangular section of a pipe therebetween. The clips extend inward from one of the legs towards an opposite one of the legs and are configured to prevent rotation of the rectangular section of the pipe with respect to the bracket.

According to a further aspect of the present invention, a method of securing a pipe against rotation in an appliance with the bracket includes the steps of inserting a fluid delivery pipe having a rectangular shaped section through a rear panel of an appliance, and securing the delivery pipe against rotation within the appliance with the bracket by positioning the first and second legs of the bracket on opposing sides of the rectangular shaped section of the fluid delivery pipe and attaching the bracket to a panel of the appliance.

According to another aspect of the present invention, a bracket for preventing rotation of a pipe includes a U-shaped member having a base, a first leg and a second leg, the first and second legs extending parallel to one another, an attachment flange connected to each of the first and second legs at substantially right angles legs for attachment of the bracket to an appliance, and a clip formed in each of the first and second legs by forming a U-shaped cut in an interior of the first and second legs and bending a portion in the center of the U-shaped cut inward towards an opposite one of the first and second legs.

According to an additional aspect of the present invention, a bracket for preventing rotation of a pipe includes a first U-shaped member and a second U-shaped member. The first U-shaped member is configured to be received in a friction fit within a substantially rectangular recess in an appliance to secure the U-shaped member against rotation. An interior of the first U-shaped member is configured to receive a pipe. The second U-shaped member is attached to the first U-shaped member with an interior of the second U-shaped member aligned with the interior of the first U-shaped member such that a pipe may be received in both the first and second U-shaped members simultaneously. A clip is formed in each of two parallel legs of the second U-shaped member for engaging a rectangular portion of a pipe.

The present invention overcomes the drawbacks of the prior art methods of attaching fluid delivery pipes to appliances by providing an anti-rotation bracket which prevents rotation of the pipe during installation of various connectors of a fluid delivery system.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, wherein:

FIG. 5 is an exploded perspective view of the anti-rotation bracket and pipe assembly according to a second embodiment of the invention;

FIG. 6 is a perspective view of the assembled anti-rotation bracket and pipe of FIG. 5;

FIG. 7 is a side sectional view of the anti-rotation bracket and pipe assembly of FIG. 5 mounted in an appliance;

FIG. 8 is a back view of the appliance of FIG. 7;

DETAILED DESCRIPTION OF THE PREFERRED EMBODIMENT

Figure 1:
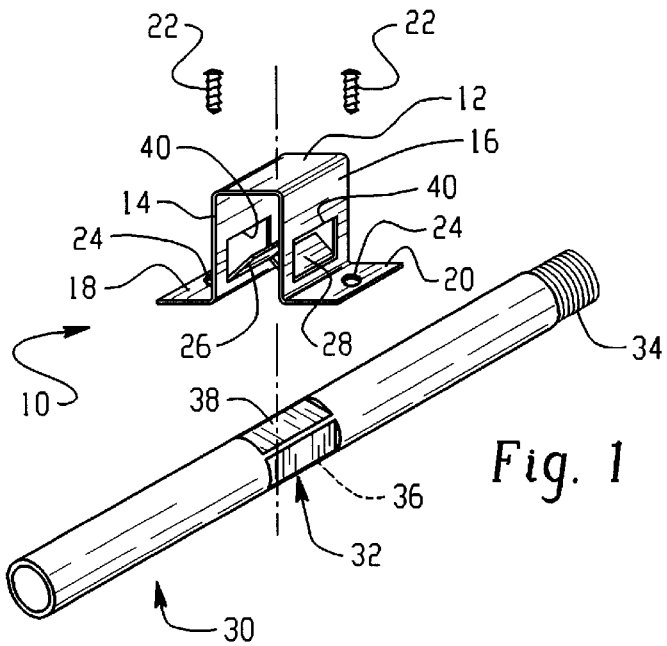
FIG. 1 is an exploded perspective view of the anti-rotation bracket and pipe assembly according to a first embodiment of the invention.
Figure 2:
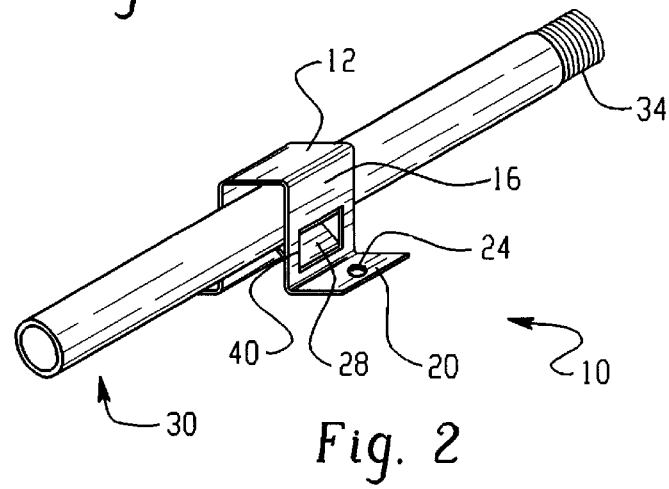
FIG. 2 is a perspective view of the assembled anti-rotation bracket and pipe of FIG. 1.

Referring now to the drawings wherein the showings are for the purposes of illustrating the preferred embodiments of the invention only and not for purposes of limiting same, the FIGURES show anti-rotation brackets according to the various embodiments of the present invention which prevent rotation of a pipe with respect to an appliance. The brackets are secured against rotation in an appliance and have an opening which is configured to receive a pipe and prevent the pipe from rotating within the bracket by engaging a rectangular section of the pipe.

A first embodiment of the anti-rotation bracket 10 is illustrated in FIGS. 1–4. The bracket 10 is substantially U-shaped having a rectangular base 12 connected to two legs 14, 16 of substantially equal lengths. The legs 14, 16 extend from the base 12 at substantially right angles. Flanges 18, 20 are formed with and extend from the legs 14, 16 for connecting the bracket to the appliance by two or more bolts 22. A bore 24 is provided at approximately the center of each of the flanges 18, 20 for receiving the bolts 22. Although bores 24 and bolts 22 have been illustrated as attachment means for retaining the bracket in the appliance, other means for attachment may also be used, such as welding, adhesive, and the like.

The anti-rotation bracket 10 includes two clips 26, 28 for engaging the pipe 30. The pipe 30 for use with the bracket 10 according to the present invention includes a rectangular crimped portion 32. The rectangular portion 32 of the pipe is preferably formed by crimping a cylindrical pipe in an area which is approximately 0.25 to 3.0 inches in length. The rectangular portion 32 is preferably spaced from a threaded end 34 of the pipe so that once the rectangular portion is secured against rotation within the bracket 10, the threaded end of the pipe is exposed outside of the appliance for attachment of a coupling or fitting.

The two clips 26, 28 of the bracket 10 engage one of the flat surfaces 36 of the pipe 30 and prevent rotation of the pipe with respect to the appliance. The clips 26, 28 are constructed by forming two U-shaped cuts 40 through the legs 14, 16 of the bracket. A portion in the center of the U-shaped cuts 40 is then bent inward towards an opposite one of the legs 14, 16. The clips 26, 28 have a length which is less than a length of the rectangular portion 32 of the pipe.

Figure 3:
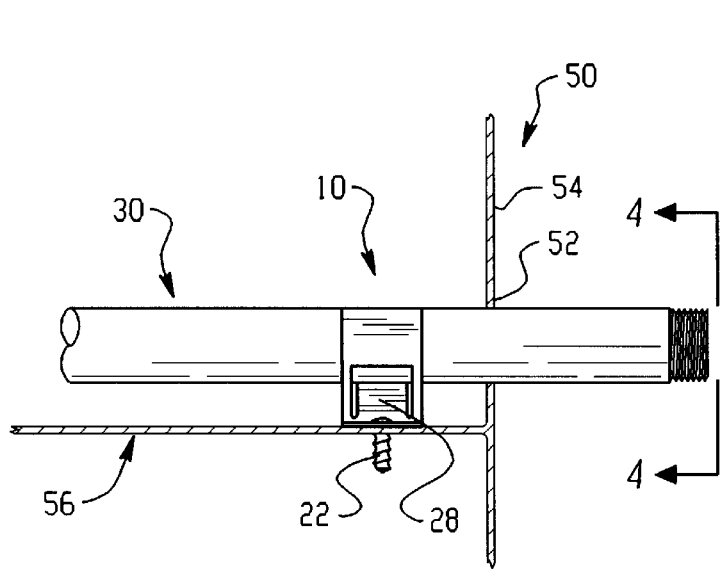
FIG. 3 is a side sectional view of the anti-rotation bracket and pipe assembly of FIG. 1 mounted in an appliance.
Figure 4:
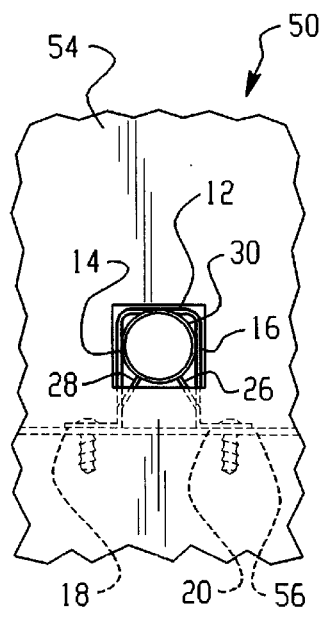
FIG. 4 is a back view of the appliance of FIG. 3.
Figure 9:
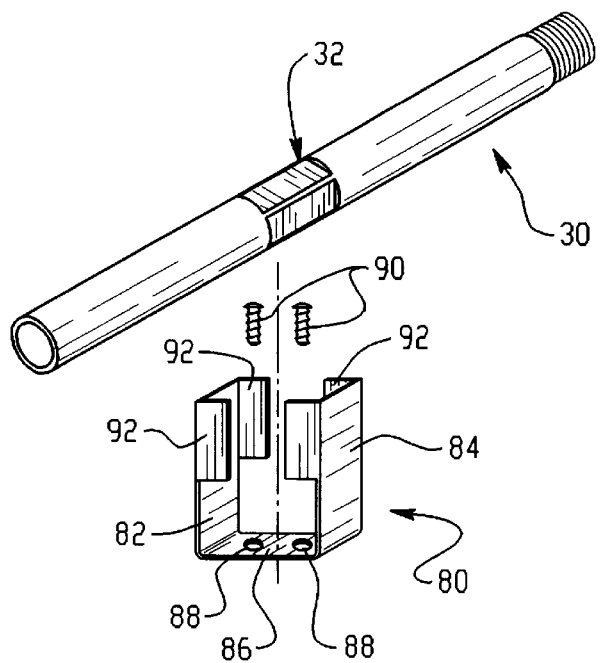
FIG. 9 is an exploded perspective view of the anti-rotation bracket and pipe assembly according to a third embodiment of the invention.
Figure 10:
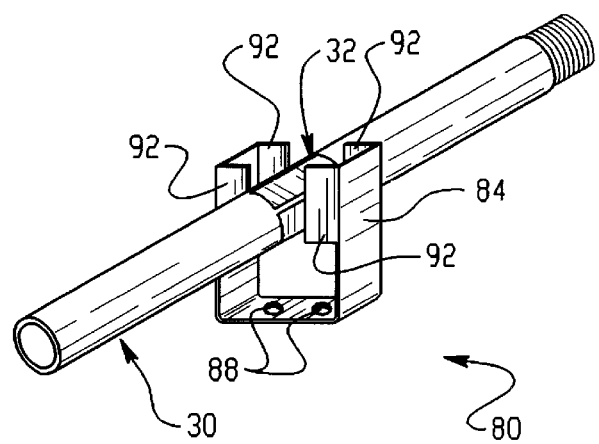
FIG. 10 is a perspective view of the assembled anti-rotation bracket and pipe of FIG. 9.
Figure 11:
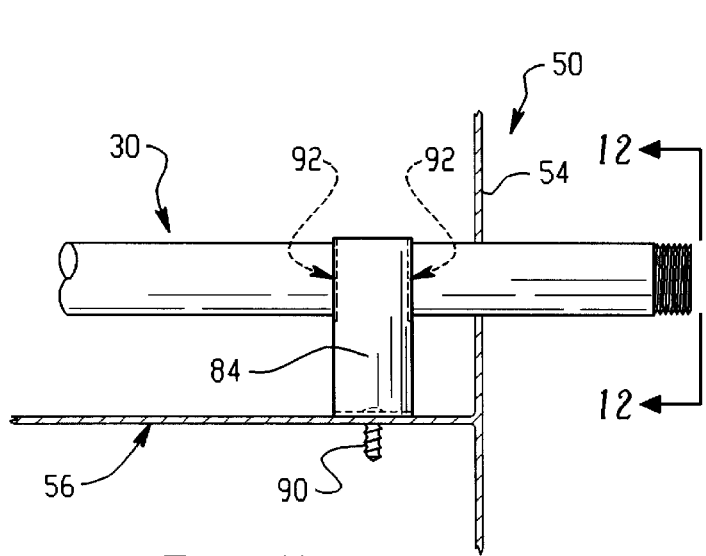
FIG. 11 is a side sectional view of the anti-rotation bracket and pipe assembly of FIG. 9 mounted in an appliance.
Figure 12:
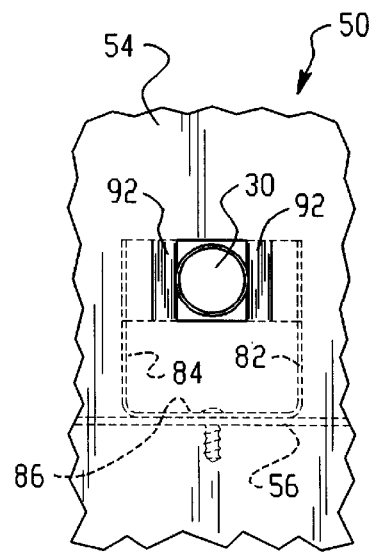
FIG. 12 is a back view of the appliance of FIG. 11.

A portion of an appliance 50 in which the pipe 30 and bracket 10 are mounted is illustrated in FIGS. 3 and 4. The pipe 30 is inserted through an opening 52 in a rear panel 54 of the appliance 50 which is located near the floor 56 of the appliance. The U-shaped bracket 10 is placed over the pipe 30 at the crimped rectangular section 32 of the pipe by snapping or sliding the bracket onto the pipe. The bracket is screwed, bolted, or otherwise attached to the floor of the appliance such that the clips 26, 28 engage a lower flat surface 36 of the pipe 30 and the base 12 of the bracket engages the opposite flat surface 38 of the pipe. The clips 26, 28 prevent the pipe 30 from rotating within the bracket 10 and also limit any longitudinal motion of the pipe with respect to the appliance 50 to the length of the rectangular section 32 of the pipe. Once the pipe 30 has been secured against rotation in the bracket 10, the installation can be completed without the need for the installer to hold the pipe to prevent rotation.

A length of the legs 14, 15 and a position of the clips 26, 28 of the bracket 10 depends on the configuration of the appliance, in particular, the distance of the opening 52 from the floor 56 of the appliance. Because the pipes 30 and the openings 52 which are provided in different appliances for the pipes may be of different shapes, sizes, and locations, the size and shape of bracket 10 may vary for use with different appliances. The size and angle of the clips 26, 28 may also be varied depending on the application.

An alternative embodiment of the anti-rotation bracket is illustrated in FIGS. 5–8. Like reference numbers have been used to indicate like parts in the alternative embodiments of the present invention. The bracket 60 has a different type of attachment mechanism for attaching the bracket to an appliance 50. In particular, the bracket 60 has an attachment member 62 which is configured to be received in a friction fit in an opening 64 in the rear panel 54 of the appliance 50. The attachment member 62 is a U-shaped member including first and second side surfaces 66, 68 and a top surface 70.

The bracket 60 also includes a second U-shaped member having first and second legs 72, 74 which are connected by a base 76 as in the embodiment of FIGS. 1–4. The legs 72, 74 have clips 78 formed by U-shaped cuts in the legs which allow the interior of the U-shaped cuts to be bent inward at an angle with respect to the legs.

The base 76 is connected to the top surface 70 of the attachment member 62 by a connecting segment 58. This connecting segment 58 allows the U-shaped attachment member 62 to be a different size than the second U-shaped portion of the bracket 60 having the clips 78. The connecting segment 58 may also connect the side surfaces 66, 68 to the edges of the legs 72, 74. The attachment member 62, the legs 72, 74, the base 76, and the connecting segment 58 are preferably formed by folding a single sheet of cut material into the desired shape.

In use, the anti-rotation bracket 60 is inserted into the opening 64 in the rear panel 54 of an appliance 50. The attachment member 62 is fit into the opening 64 such that rotation of the bracket in the opening is not possible. The pipe 30 is inserted into the bracket 60 until the rectangular crimped portion 32 of the pipe snaps or slides into engagement with the clips 78. In this manner, the pipe 30 is secured against rotation within the appliance 50 as well as against longitudinal movement.

According to a third embodiment of the present invention, as shown in FIGS. 9–12, a bracket 80 includes first and second legs 82, 84, and a base 86 connecting the legs. The base 86 is provided with two bores 88 through which screws 90 are inserted to attach the bracket 80 to a floor 56 of the appliance 50. The clips or means for securing a pipe 30 non-rotatably within the bracket 80 are provided by a pair of flanges 92 on each of the legs. The flanges 92 extend substantially perpendicular to the legs 82, 84 and substantially perpendicular to the base 86. The length of the legs 82, 84 and the location of the flanges 92 on the legs depend on the location of the floor 56 with respect to the opening 52 in the rear panel 54 of the appliance.

The brackets according to all of the foregoing embodiments are preferably formed from a single sheet of material which is cut and then folded to a desired configuration. However, the brackets may also be formed by other known methods such as molding. The brackets are preferably formed of zinc plate, however, many other materials may also be used.

Although the present invention has been described as particularly useful for securing fluid delivery pipes against rotation in an appliance, it should be understood that the bracket according to the present invention can also be used for securing other type of conduits to support surfaces in general.

While the invention has been described in detail with reference to a preferred embodiment thereof, it will be apparent to one skilled in the art that various changes can be made, and equivalents employed without departing from the spirit and scope of the invention.

Having thus described the invention, it is claimed:

1. A bracket for preventing rotation of a pipe in an appliance, the bracket comprising:

a U-shaped member having a base, a first leg, and a second leg, the first and second legs having substantially equal lengths, and the first and second legs adapted to be spaced to receive therebetween a rectangular section of a pipe;

an attachment mechanism for securing the U-shaped member to the appliance, the attachment mechanism including a friction fit member which is attached to an end of the U-shaped member and is adapted to be configured to fit in a non-rotatable friction fit into an opening in a rear panel of the appliance, the friction fit member having a passage therethrough which is aligned with a space between the first and second legs such that a pipe may extend through the passage in the friction fit member and through the space between the first and second legs; and, at least one clip extending from each of the first and second legs inward towards an opposite one of the first and second legs, the at least one clip of each of the first and second legs configured to engage the pipe and to prevent rotation of the rectangular section of the pipe with respect to the bracket, the clips on the first and second legs being formed by a U-shaped cut in the first and second legs and bending a portion in the center of the U-shaped cut inward towards an opposite one of the first and second legs.

2. The bracket according to claim 1, wherein the attachment mechanism is the base of the U-shaped member which is adapted to be secured to a surface of an appliance.

3. The bracket according to claim 1, wherein the attachment mechanism is a flange connected to each of the first and second legs at substantially right angles to the first and second legs for attachment of the bracket to an appliance.

4. The bracket according to claim 3, wherein the bracket is adapted to be configured to be attached to a floor of the appliance by screws extending through the flanges.

5. The bracket according to claim 1, wherein the friction fit member is a U-shaped member adapted to be configured to fit into a rectangular opening in the rear panel of the appliance.

6. The bracket according to claim 1, wherein the friction fit member is connected to the base of the U-shaped member.

7. The bracket according to claim 1, wherein the friction fit member is attached to at least one of the first and second sides of the U-shaped member.

8. A bracket for preventing rotation of a pipe, the bracket comprising:

a first U-shaped member adapted to be configured to be received in a friction fit within a substantially rectangular recess in an appliance to secure the U-shaped member against rotation;

an interior of the first U-shaped member adapted to be configured to receive a pipe;

a second U-shaped member attached to the first U-shaped member with an interior of the second U-shaped member aligned with the interior of the first U-shaped member such that a pipe may be received in both the first and second U-shaped members simultaneously, the second U-shaped member having first and second parallel legs; and, a clip formed in each of the first and second parallel legs of the second U-shaped member for engaging a rectangular portion of a pipe.

9. The bracket according to claim 8, wherein the clips in each of the first and second legs are formed by forming a U-shaped cut and bending a portion in a center of the U-shaped cut inward towards an opposite one of the first and second legs.

10. The bracket according to claim 8, wherein the first U-shaped member is larger than the second U-shaped member.

11. The bracket according to claim 10, wherein a connecting member connects a base of the first U-shaped member to a base of the second U-shaped member.

12. The bracket according to claim 8, wherein the bracket is formed of zinc plate.

13. A bracket for preventing rotation of a pipe in an appliance, the bracket comprising:

a U-shaped member having a base, a first leg, and a second leg, the first and second legs having substantially equal lengths, and the first and second legs adapted to be spaced to receive a rectangular section of a pipe therebetween;

an attachment mechanism for securing the U-shaped member to an appliance; and, at least one clip extending from each of the first and second legs inward towards an opposite one of the first and second legs, the at least one clip of each of the first and second legs adapted to be configured to engage the pipe and to prevent rotation of the rectangular section of the pipe with respect to the bracket, the clip on each of the first and second legs including two flanges extending from two opposite side edges of each of the first and second legs, the two flanges extending substantially perpendicular to the first and second legs and substantially perpendicular to the base of the U-shaped member.

14. The bracket according to claim 13, wherein the attachment mechanism is the base of the U-shaped member which is secured to a surface of the appliance.

* * * * *